United States Patent

Sorensen et al.

[11] Patent Number: 5,467,903
[45] Date of Patent: Nov. 21, 1995

[54] APPARATUS FOR DISPENSING MEASURED AMOUNTS OF GRANULAR PRODUCT

[75] Inventors: Gerald R. Sorensen, Elgin; Raymond J. Gradecki, Mundelein, both of Ill.

[73] Assignee: NCM International, Inc., Arlington Heights, Ill.

[21] Appl. No.: 230,309

[22] Filed: Apr. 20, 1994

[51] Int. Cl.⁶ ............................................. G01F 11/26
[52] U.S. Cl. ............................... 222/455; 222/456
[58] Field of Search ................................. 222/454, 455, 222/456

[56] References Cited

U.S. PATENT DOCUMENTS

| | | | |
|---|---|---|---|
| 2,091,929 | 8/1937 | Kappenberg | 222/455 |
| 2,243,452 | 5/1941 | Bickel et al. | 222/455 |
| 2,609,967 | 9/1952 | Persons | 222/455 X |
| 2,752,076 | 6/1956 | Locker | 222/455 |
| 3,185,357 | 5/1965 | Merkel | 222/455 X |
| 3,836,055 | 9/1974 | Katzmark et al. | 222/455 X |
| 4,151,934 | 5/1979 | Saeki | 222/455 X |
| 4,159,791 | 7/1979 | Crutcher | 222/454 |
| 4,170,318 | 10/1979 | Saeki et al. | 222/455 |
| 4,214,679 | 7/1980 | Whang | 222/456 X |
| 4,424,921 | 1/1984 | Feuerstein et al. | 222/456 |
| 4,756,433 | 7/1988 | Lin | 222/207 X |
| 4,951,839 | 8/1990 | Kong | 222/454 X |
| 5,011,048 | 4/1991 | Mark | 222/455 |
| 5,029,736 | 7/1991 | Maruyama et al. | 222/455 |
| 5,064,106 | 11/1991 | Butler et al. | 222/456 |
| 5,065,923 | 11/1991 | Hoefer et al. | 222/457 X |
| 5,148,953 | 9/1992 | Fudalla | 222/455 X |
| 5,261,575 | 11/1993 | Keller | 222/455 |
| 5,323,938 | 6/1994 | Ceccarelli et al. | 222/456 X |

FOREIGN PATENT DOCUMENTS

| | | | |
|---|---|---|---|
| 2590555 | 11/1985 | France . | |
| 393646 | 6/1933 | United Kingdom | 222/455 |

*Primary Examiner*—Andres Kashnikow
*Assistant Examiner*—Kenneth Bomberg
*Attorney, Agent, or Firm*—Wallenstein & Wagner, Ltd.

[57] ABSTRACT

An apparatus for dispensing a measured amount of granular product, such as powdered flavoring for milk, is disclosed. The apparatus comprises a container having an open end and a dispenser secured thereto. The container open end is upwardly oriented when the container is in an upward position and the open end is downwardly oriented when the container is in an inverted position. The dispenser covers the container open end and includes a first chamber, a second chamber and a spout. Product moves from the container to the first chamber when the container is rotated from the upward position to the inverted position. Product moves from the first chamber to the second chamber when the container is subsequently rotated from the inverted position to the upward position. Product moves from the second chamber to exit the dispenser through the spout when the container is subsequently rotated from the upward position to the inverted position.

8 Claims, 3 Drawing Sheets

5,467,903

APPARATUS FOR DISPENSING MEASURED AMOUNTS OF GRANULAR PRODUCT

TECHNICAL FIELD

The invention relates to an apparatus for dispensing measured amounts of granular product, such as powdered flavoring for milk.

BACKGROUND PRIOR ART

With granular food product, such as powdered chocolate flavoring for milk supplied in a conventional container, one typically adds the food product in incremental amounts. One such way is to utilize a conventional measuring device, such as a teaspoon. However, if many glasses are made, especially over time, this often requires many spoons. Alternatively, one could simply dump estimated amounts straight from the container. However this often results in wasted food product and a mess.

The present invention is provided to solve these and other problems.

Summary of the Invention

It is an object of the present invention to provide an apparatus for dispensing a measured amount of granular product.

In accordance with the invention, the apparatus comprises a container having an open end. The open end is upwardly oriented when the container is in an upward position and the open end is downwardly oriented when the container is in an inverted position. The apparatus further comprises a dispenser covering the container open end. The dispenser includes a first chamber, a second chamber and a spout. Product moves from the container to the first chamber when the container is rotated from the upward position to the inverted position. Product moves from the first chamber to the second chamber when the container is subsequently rotated from the inverted position to the upward position. Finally, product moves from the second chamber to exit the dispenser through the spout when the container is subsequently rotated from the upward position to the inverted position. At this time, additional product refills the first chamber.

It is contemplated that the product from the container substantially fills the first chamber when the container is rotated from the upward position to the inverted position. Thus the volume of the first chamber effectively functions to measure a predetermined amount of the product for each use.

It is further contemplated that the granular product comprises a powder.

It is still further contemplated that the apparatus includes means for breaking lumps of the powder prior to the powder entering the first chamber. The lump breaking means can be, for example, a triangular projection extending downwardly from the dispenser.

Other features and advantages of the invention will be apparent from the following specification taken in conjunction with the following drawings.

DETAILED DESCRIPTION

Figure 1:
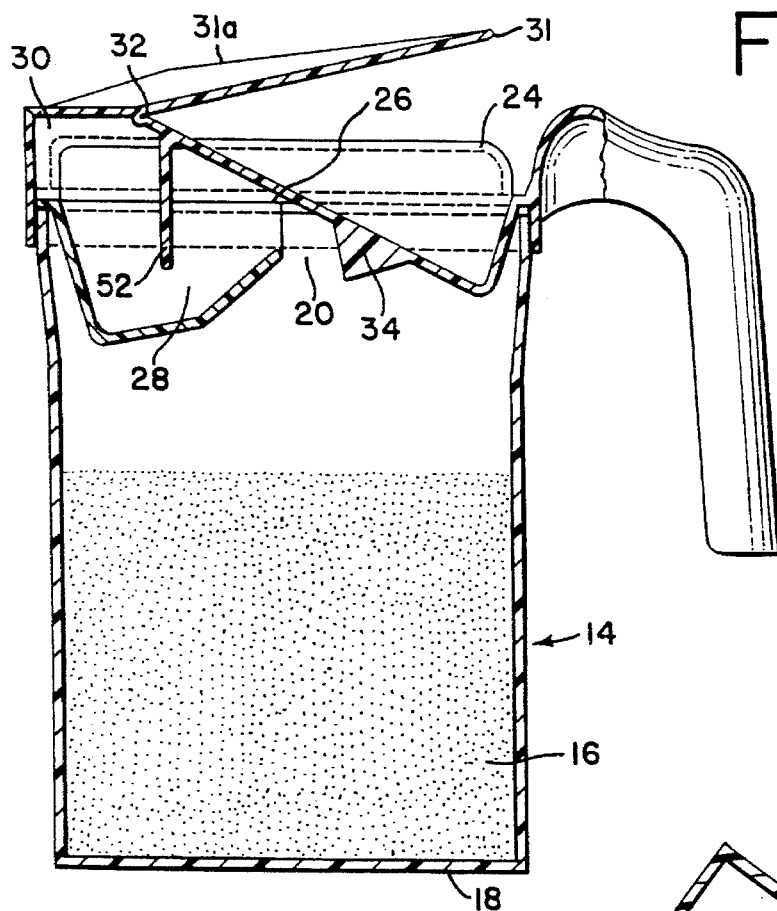
FIG. 1 is a sectional view of an apparatus for dispensing measured amounts of granular product in accordance with the invention, with the apparatus disposed in a generally upward orientation.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

An apparatus, generally designated 14, for dispensing a measured amount of granular product 16 is illustrated in FIGS. 1–4. The granular product is contemplated to be a food product, such as powdered chocolate for flavoring milk, instant coffee or tea, candy or the like.

Figure 2:
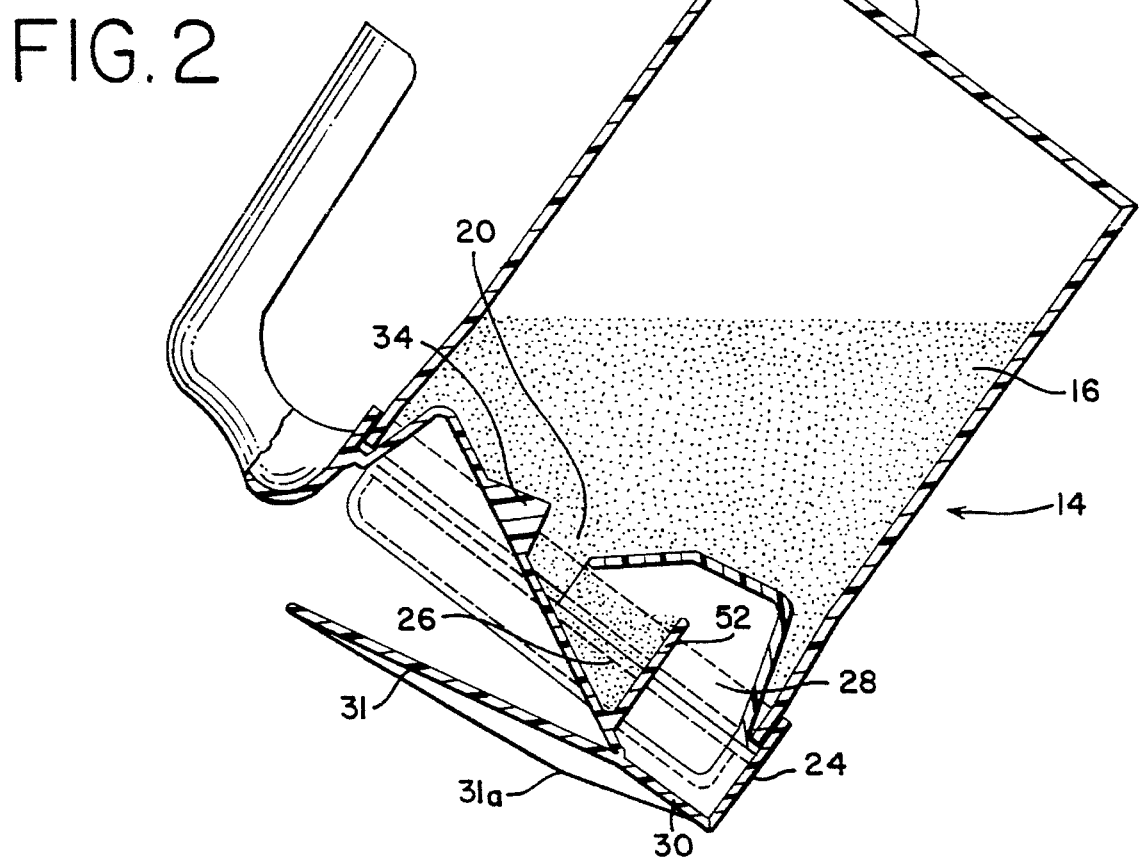
FIG. 2 is a sectional view of the apparatus of FIG. 1, with the apparatus disposed in a generally inverted orientation, and with the product moved to a first chamber.
Figure 3:
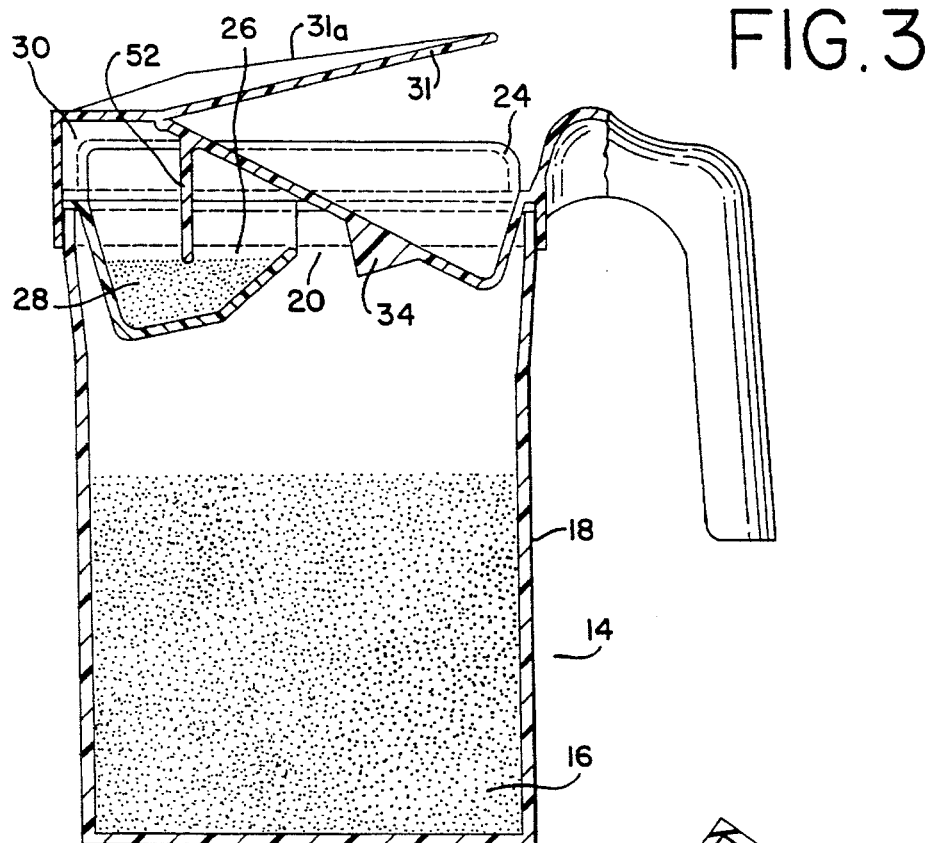
FIG. 3 is a sectional view of the apparatus of FIG. 1, with the apparatus disposed in the generally upward orientation, but with the product moved to a second chamber.
Figure 4:
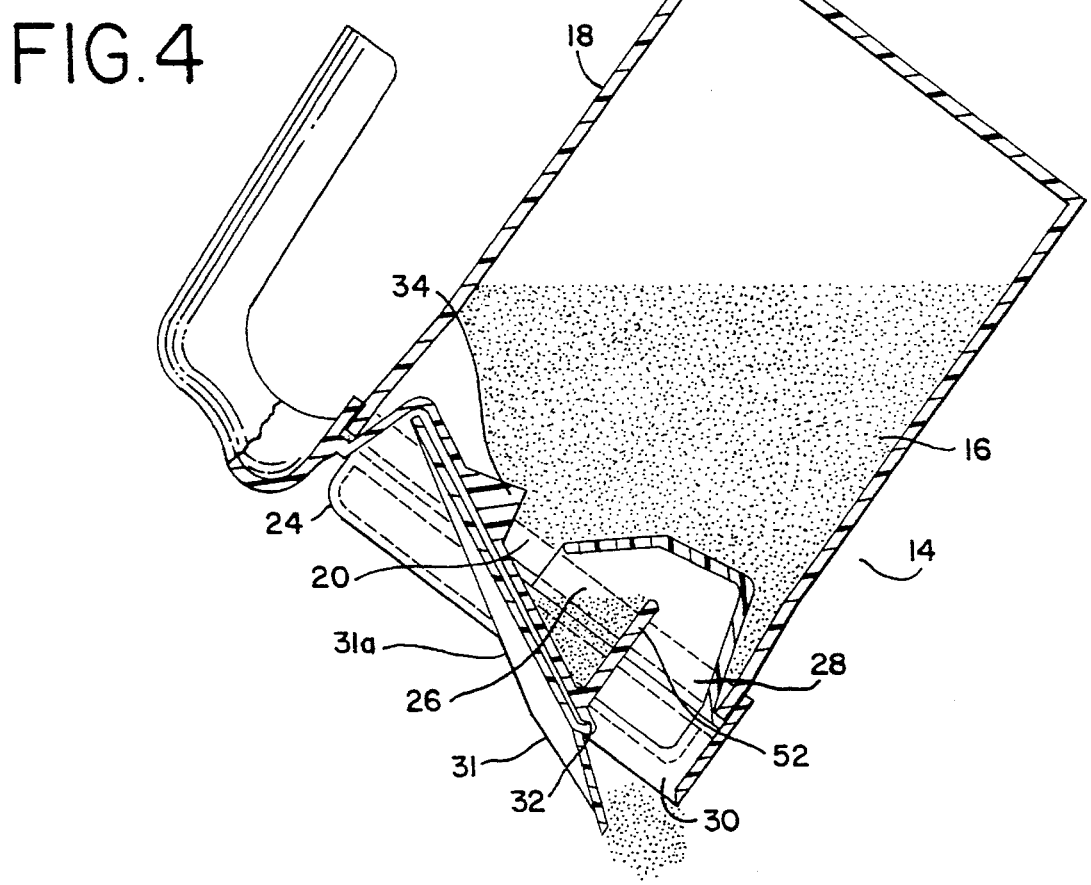
FIG. 4 is a sectional view of the apparatus of FIG. 1, with the apparatus disposed in the generally inverted orientation, but with the product dispensing from the second chamber.

The apparatus 14 is formed of polypropylene and comprises a container 18 having an open end 20. The open end 20 is upwardly oriented when the container 18 is in an upward position, as illustrated in FIGS. 1 and 3. The open end 20 is downwardly oriented when the container 18 is in an inverted position, as illustrated in FIGS. 2 and 4.

The apparatus 14 further comprises a dispenser 24 covering the container open end 20. The dispenser 24 includes a first chamber 26, a second chamber 28 and a spout 30. The dispenser 24 further includes a spout cover 31 having a reinforcing rib 31a pivotally secured to the balance of the dispenser by means of a living hinge 32. As illustrated sequentially in FIGS. 1–4, the product 16 moves from the container 18 to the first chamber 26 when the container 18 is rotated from the upward position to the inverted position (i.e., from the orientation of FIG. 1 to the orientation of FIG. 2). The product 16 substantially fills the first chamber 26 when the container 18 is rotated from the upward position to the inverted position to provide a pre-measured amount of the product 16. Then the product 16 moves from the first chamber 26 to the second chamber 28 when the container 18 is subsequently rotated from the inverted position to the upward position (i.e., from the orientation of FIG. 2 to the orientation of FIG. 3). Finally, the product 16 moves from the second chamber 28 to exit the dispenser 24 through the spout 30 when the container 18 is subsequently rotated from the upward position to the inverted position (i.e., from the orientation of FIG. 3 to the orientation of FIG. 4). At this time, the product 16 also refills the first chamber 26.

It has been found that certain granular food products, such as powdered chocolate, occasionally forms lumps. Thus the apparatus 14 includes a pair of spaced triangular projections 34 extending downwardly from the dispenser 24 (shown in phantom in FIG. 6) for breaking the lumps of the product 16 prior to the powder entering the first chamber 26.

Figure 5:
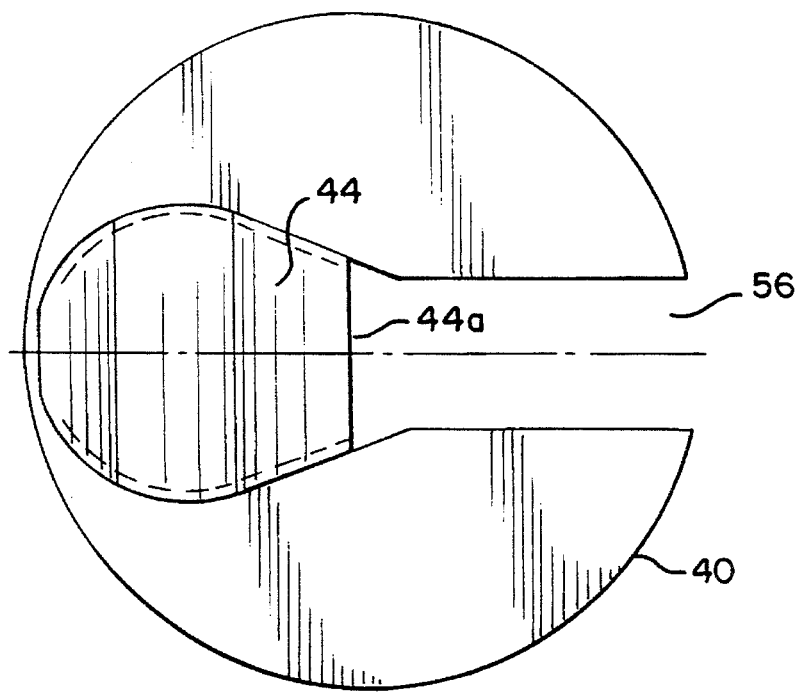
FIG. 5 is a bottom view of an insert as utilized in the apparatus of FIG. 1.
Figure 6:
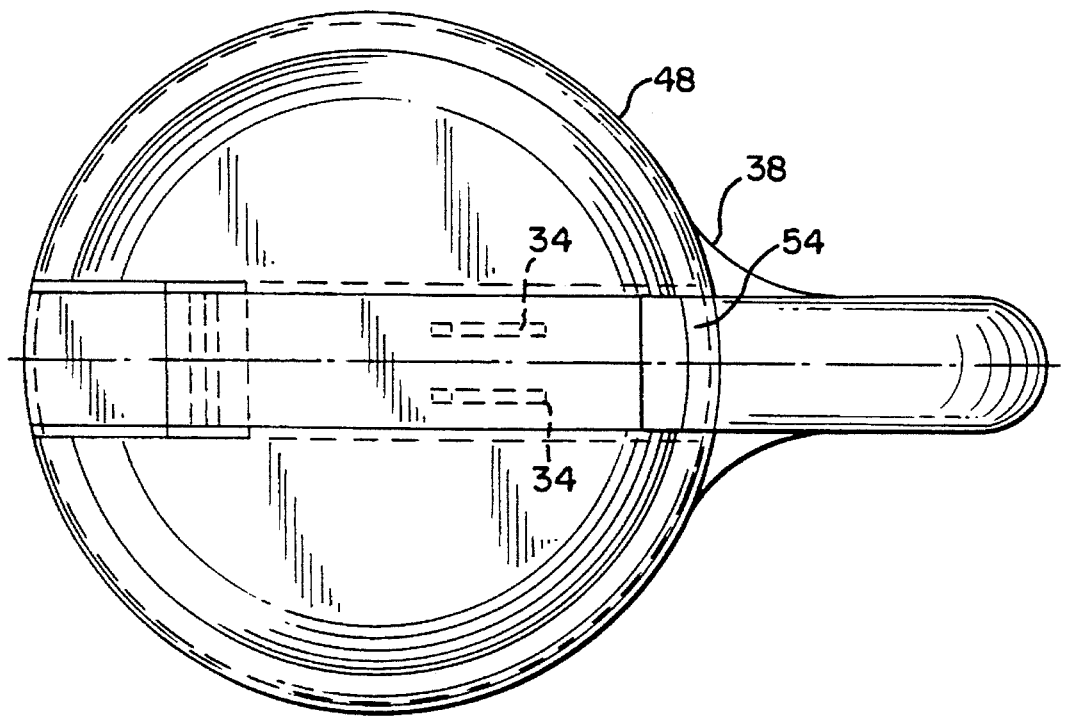
FIG. 6 is a top view of a cap as utilized in the apparatus of FIG. 1.

Referring to FIG. 5 and FIG. 6, the dispenser 24 for covering the container open end 20 comprises a cap 38 and an insert 40. The cap 38 and the insert 40 cooperate to form the first chamber 26, the second chamber 28 and the spout 30.

The insert 40 is generally planer about its periphery and includes a generally central, downwardly oriented recess 44 having an opening 44a which leads into the container 18 when the dispenser 24 is attached to the container 18.

The cap 38 is generally planer and includes a peripheral lip 48 for securing the cap 38 to the container 18, as is well known. The lip 48 also functions to secure the insert 40 to the cap 38 by means of an interference fit with the periphery of the insert 40. The cap 38 further includes a downwardly oriented baffle 52 (see also FIGS. 1–4) which extends into the insert recess 44 to substantially divide the insert recess 44 and define the first chamber 26 and the second chamber 28, though permitting flow of the product 16 therebetween. The cap 38 also includes the spout 30 in fluid communication with the second chamber 28. A ridge 54 of the cap 38 cooperates with a gap 56 in the insert 40 to properly align the insert 40 with the cap 38.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An apparatus for dispensing a measured amount of granular product, said apparatus comprising:

a container having an open end, wherein said open end is upwardly oriented when said container is in an upward position and said open end is downwardly oriented when said container is in an inverted position;

a dispenser covering said container open end, said dispenser including a first chamber, a second chamber and a spout, wherein product moves from said container to said first chamber when said container is rotated from said upward position to said inverted position, product moves from said first chamber to said second chamber when said container is subsequently rotated from said inverted position to said upward position, and product moves from said second chamber to exit said dispenser through said spout when said container is subsequently rotated from said upward position to said inverted position; and, means for breaking lumps of said granular product prior to said granular product entering said first chamber, said lump breaking means comprising a pair of spaced triangular projections extending downwardly from said dispenser.

2. The apparatus of claim 1 wherein said product from said container substantially fills said first chamber when said container is rotated from said upward position to said inverted position.

3. An apparatus for dispensing a measured amount of granular product, said apparatus comprising:

a container having an open end, wherein said open end is upwardly oriented when said container is in an upward position and said open end is downwardly oriented when said container is in an inverted position; and a dispenser covering said container open end, said dispenser comprising a cap and an insert secured thereto;

wherein said insert is generally planer about its periphery and includes a generally central, downwardly oriented recess having an opening into said container;

and said cap is generally planer and includes a peripheral lip for securing said cap to said container and for securing said insert to said cap, said cap further including a downwardly oriented baffle extending into said insert recess to substantially divide said insert recess into a first chamber and a second chamber in fluid communication with said first chamber, said cap further including a spout in fluid communication with said second chamber, wherein product moves from said container into said first chamber when said container is rotated from said upward position to said inverted position, product moves from said first chamber to said second chamber when said container is subsequently rotated from said inverted position to said upward position, and product moves from said second chamber to exit said dispenser through said spout when said container is subsequently rotated from said upward position to said inverted position; and, means for breaking lumps of said granular product prior to said granular product entering said first chamber, said lump breaking means comprising spaced triangular projections extending downwardly from said dispenser.

4. The apparatus of claim 3 wherein said product from said container substantially fills said first chamber when said container is rotated from said upward position to said inverted position.

5. The apparatus of claim 3 wherein said cap includes a handle tangentially attached to said dispenser and said container.

6. An apparatus for dispensing a measured amount of granular product, said apparatus comprising:

a container having an open end, wherein said open end is upwardly oriented when said container is in an upward position and said open end is downwardly oriented when said container is in an inverted position;

a dispenser covering said container open end, said dispenser including a first chamber, a second chamber and a spout, wherein product moves from said container to said first chamber when said container is rotated from said upward position to said inverted position, product moves from said first chamber to said second chamber when said container is subsequently rotated from said inverted position to said upward position, and product moves from said second chamber to exit said dispenser through said spout when said container is subsequently rotated from said upward position to said inverted position; and, means for breaking lumps of said granular product prior to said granular product entering said first chamber, said lump breaking means comprising spaced planar projections extending downwardly from said dispenser.

7. The apparatus of claim 6 wherein said lump breaking means further includes a pair of spaced planar projections.

8. The apparatus of claim 7 wherein said planar projections are triangular.

* * * * *